(No Model.)
R. CONNABLE.
FREEZING PAN OR TRAY FOR FISH, &c.
No. 386,383. Patented July 17, 1888.
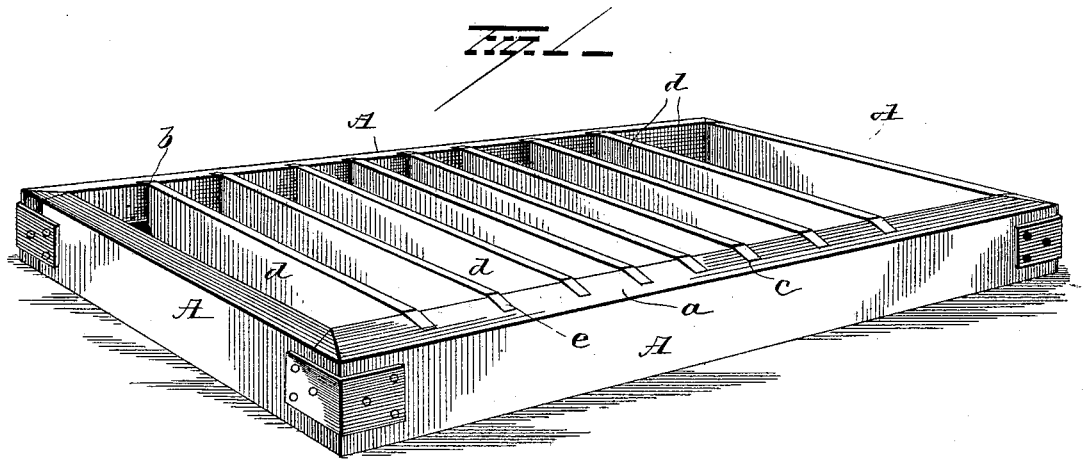
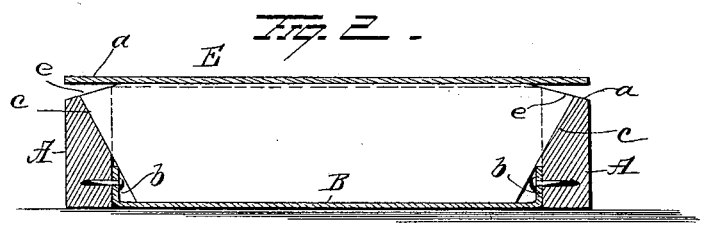
Witnesses.
F. Nottingham.
G. F. Downing.
Inventor,
Ralph Connable,
By his Attorneys
Leggett and Leggett.

UNITED STATES PATENT OFFICE.

RALPH CONNABLE, OF PETOSKEY, MICHIGAN.

FREEZING PAN OR TRAY FOR FISH, &c.

SPECIFICATION forming part of Letters Patent No. 386,383, dated July 17, 1888.

Application filed November 30, 1887. Serial No. 256,525. (No model.)

*To all whom it may concern:*

Be it known that I, RALPH CONNABLE, of Petoskey, in the county of Emmett and State of Michigan, have invented certain new and useful Improvements in Freezing Pans or Trays for Fish, &c.; and I do hereby declare the following to be a full, clear, and exact description of the invention, such as will enable others skilled in the art to which it appertains to make and use the same.

My invention relates to an improvement in pans or trays for fish, meat, or game desired to be frozen. Hitherto pans with covers for this purpose have been made of galvanized iron and of a size to correspond with the size of cakes designed for market or transportation. This makes the pans small, expensive, necessarily numerous, and in the aggregate of enormous bulk.

The object of my present invention is to construct a pan about the size of an ordinary-sized sheet of galvanized iron or of any smaller size, if desired, but made so as to utilize the latter without the usual annoyance and expense of cutting the sheets and forming them into pans and covers.

A further object is to provide a pan or tray of such construction that its contents may be readily shaped, frozen, and removed in separable cakes of any desired size.

In the accompanying drawings, Figure 1 is a perspective view of the pan with its cover removed. Fig. 2 is a transverse section through the pan and cover.

A represents a frame, preferably of an oblong form, with a beveled upper edge, *a*. The size of the frame is about the same as that of an ordinary-sized sheet of galvanized iron, so that one of these sheets, B, may be utilized as a bottom for the frame by simply turning or flanging its edges *b* in such a manner that the flanged portions may be either secured to the inner or outer faces of the frame.

In the upper portion of the inside of the frame slanting notches or open slots *c* are formed. These notches are arranged at corresponding distances apart on the two opposite sides of the frame, and the space between notches in each pan being but a few inches, the partitions may be placed at varying distances from each other, no more partitions being used in any one pan or tray than is desired. By this arrangement when the partitions are thus inserted the size of the chambers or compartments *d* which form the cakes of frozen material may be large or small.

It will be observed that the notches have an outward incline, and that the ends of the removable partitions have correspondingly-beveled ends, so that they slide into the box easily and also drop out of the box with facility when it is inverted. The partitions and frame of pan are preferably made of wood; but other materials, and even metal, may be used in their construction.

Another thing to be observed in the construction of the partitions is that their main portion or middle is a little higher than the edge of the box-frame, their extreme ends *e* being cut to fall in a plane with or be flush with the beveled upper edge, *a*, of the frame. The utility of this construction is obvious when it is explained that a galvanized iron or other metal sheet, E, is put over the frame when the latter is placed in the freezing-chamber or freezing mixture, in order to conduct the dripping brine to the outside of the pan and prevent the brine from coming in contact with its contents, and also to prevent the weight of material above the pans from compressing the articles which are being frozen.

When a pan has been filled and covered with a sheet of galvanized iron or other sheet of metal, as described, the whole is overlaid with a layer of freezing material. A second pan is then placed on top, filled, and covered, as before described, until the whole amount of material to be frozen is disposed of. Any number of tiers of pans may be formed, according to the amount of material to be frozen. After the pans have remained in freezing mixture a sufficient length of time, (generally about twelve hours,) the top covering of ice or freezing compound is removed, the sheet covering the top pan laid aside, and the pan with its contents carried to a large table and turned bottom side up. A pail of cold water is then poured over the bottom while the pan is inverted, this operating to draw the frost sufficiently to allow the material in the pan to separate from the sides and bottom of the pan. The pan is then readily removed, leaving the whole frozen cake upon the table, including the several partitions that may have been introduced for the purpose hereinbefore named. A slight rap upon these partitions separates them from the frozen material, leaving the whole mass neatly divided into cakes of the sizes originally designed when packed for freezing.

Having fully described my invention, what I claim as new, and desire to secure by Letters Patent, is—

1. The combination, with the frame having a beveled upper edge and slanting notches in the inner face of the frame, of a set of partitions having beveled ends, said partitions adapted to rest in the notches and drop out of the same on the inversion of the frame, substantially as set forth.

2. The combination, with a frame, a metallic bottom secured thereto, and a removable metallic lid or cover, said frame having a beveled upper edge and slanting notches in its inner faces, of a set of removable partitions having beveled ends adapted to rest in the notches of the frame, the upper edges of these partitions being higher than the ends of the frame, for the purpose described and set forth.

In testimony whereof I have signed this specification in the presence of two subscribing witnesses.

RALPH CONNABLE.

Witnesses:
GEO. E. SPRANG,
W. F. LAWTON.